United States Patent Office 3,557,458
Patented Jan. 26, 1971

3,557,458
CODING THEODOLITE
Voldemar Garrievich Shults, Leningrad, U.S.S.R., assignor to Vsesojuzny Nanchno-Issledovatelsky Institut Gornoi Geomekhaniki, Leningrad, U.S.S.R.
Filed Mar. 4, 1968, Ser. No. 710,223
Int. Cl. G01c 1/02
U.S. Cl. 33—69                                 3 Claims

ABSTRACT OF THE DISCLOSURE

A coding theodolite comprises a transparent circular plate having a concentric coding scale fixed on the vertical axis of the theodolite and a first diaphragm with an aperture arranged parallel to the plate in front of the coding scale. In front of the aperture is a first illumination means on the other side of the plate and a second diaphragm is rigidly fixed on the horizontal axis of the theodolite and is provided with at least one radial slit. A second illumination means is provided on one side of the second diaphragm for illuminating the slit therein and a first optical system is provided for receiving a light beam passing through the slit in the second diaphragm and for projecting the image of this slit onto the coding scale of the plate, such that angular movements of the slit in the second diaphragm in a vertical plane is equal to the angular movements of the image of the slit on the coding scale of the plate. A second optical system faces the coding scale for projecting to a photoregister an image of a portion of the coding scale which is in front of the aperture of the first diaphragm and an image of the portion of the coding scale which is illuminated by the image of the slit in the second diaphragm.

SUMMARY

A coding theodolite, wherein the values of the horizontal and vertical angles involved are automatically recorded as a digital code on a photographic film provided in a photoregister by means of transducers capable of converting the values of the horizontal and vertical angles being measured, into a digital code, said transducers being provided with a common code disk.

The present invention relates to geodetic instruments and more particularly to coding theodolites employed in taking measurements in geodetic surveys and mining practice.

Known in the art are theodolites, wherein the values of the horizontal and vertical angles measured thereby, are registered automatically on photographic film by means of transducers capable of converting the values of horizontal and vertical angles, respectively, into a digital code.

To take readings of the horizontal and vertical angles said coding theodolites employ two transducers capable of converting the values of the horizontal and vertical angles into a digital code, each of said transducers being provided with its particular code disk. Due to the high cost of the code disks, their utilization in a theodolite of commercial grade accuracy is not common.

It is a primary object of the present invention to provide a coding theodolite which is inexpensive in manufacture.

It is another object of the present invention to provide a coding theodolite which is suitable for use in geodetic surveys and engineering work, where a commercial grade of accuracy is involved.

In keeping with the abovementioned and other objects, in the coding theodolite according to the invention a transducer capable of converting the values of the vertical angles into a digital code is so made that in taking measurements of the horizontal and vertical angles, the horizontal circle of the theodolite is used as a common code disk for both of said transducers.

It is expedient that with a view to employ the horizontal circle as a common code disk for both of the transducers, the transducer capable of converting the values of the vertical angles into a digital code, incorporate a diaphragm rigidly fixed in position on the horizontal axle of the telescope, said diaphragm being provided with at least one slit whose image by virtue of the optical system arranged between the diaphragm and the code disk, is projected thereonto when taking measurements of the angle involved.

The aforesaid diaphragm may be made as a disk provided with radial slits equidistantly spaced around the periphery thereof, each of said slits being provided as a digital code on said disk in close proximity to the corresponding slit.

Such construction makes it possible to reduce the cost of manufacture of coding theodolites.

Other objects and advantages of the present invention will be apparent from a consideration of a description of an exemplary embodiment thereof to be had in conjunction with the accompanying drawings, wherein.

Figure 1:
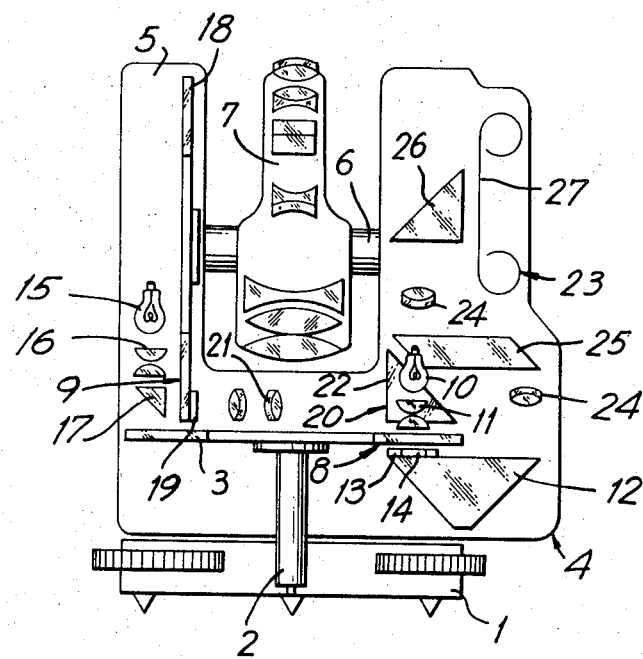
FIG. 1 is a diagrammatic elevation view of the theodolite according to the invention taken in axial section.

Now referring to FIG. 1, the coding theodolite according to the invention comprises a carrier 1 on whose vertical axle 2 a horizontal plate 3 is rigidly fixed in position. A movable portion 4 of the theodolite is mounted on said axle 2 which at the same time serves as the vertical axis thereof, said movable portion 4 incorporating a casing 5 with a horizontal axle 6 which is essentially the horizontal axis of the theodolite, a telescope 7 being fixed in position on said axle 6. The latter axle 6 is at the same time the rotational axis of the telescope 7. The casing 5 accommodates a transducer 8 capable of converting the values of the horizontal angles into a digital code, as well as a transducer 9 capable of converting the values of the vertical angles into a digital code. The transducer 8 comprises an illuminator 10 with a condenser lens 11 and a diaphragm 13 with an aperture 14 (FIG. 2) made fast on a truncated rectangular prism 12. The diaphragm 13 (FIG. 1) is located on the condenser lens 11 opposite the horizontal plate 3 which serves as a code disk of the transducer 8. The transducer 9 comprises an illuminator 15 with a condenser lens 16, a rectangular prism 17, and a diaphragm 18 constituted as a disk with a slit 19.

The diaphragm 18 is rigidly secured to the axle 6. By means of an optical system 20 comprising an objective lens 21 and a rectangular prism 22 and located between the diaphragm 18 and the horizontal plate 3 (which serves as a code disk for the transducer 8) the image of the illuminated slit 19 is projected into the plane of the horizontal plate 3, provided both the slit aperture 19 and the image thereof projected onto the horizontal plate 3 turn through the same angle. The transducers 8 and 9 are provided with a common photoregister 23 comprising the prism 12, an objective lens 24, prisms 25 and 26 and a photographic film 27. A device for moving and storing the photographic film is essentially a still camera devoid of its objective portion (not appearing in the drawing). Also not shown in the drawing are cylindrical and spherical level gauges employed for a spatial orientation of the theodolite.

Figure 3:
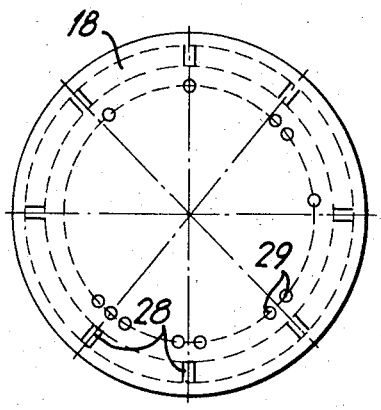
FIG. 3 is side elevation view of the diaphragm of the theodolite according to the invention made as a disk provided with radial slit apertures equidistantly spaced around the periphery thereof.

According to another embodiment of the present invention the diaphragm 18 is constituted as a disk provided with radial slits 28 (FIG. 3) spaced around the periphery thereof, the ordinal number of each of said slits being provided on said disk in close proximity to each of said slits 28 as a digital code 29.

The operating principle of the herein-disclosed theodolite according to the invention, is as follows.

Prior to taking measurements, the amount of unexposed photographic film 27 remaining should be checked by making use of the frame counter of the photoregister 23 and then the theodolite is levelled by means of the adjustment screws of the carrier 1.

When taking measurements of the horizontal angles, the telescope 7 is aimed at the first collimating point. In so doing the movable portion 4 of the theodolite and, consequently, the diaphragm 13 fixed on said movable portion 4, will turn through an angle with respect to the horizontal plate 3. At the very moment of taking measurements, the illuminator 10 is switched on thus illuminating a portion of the plate 3 via the condenser lens 11. The image of the portion of the code disk located opposite the aperture 14 is projected onto the photographic film 27 by means of the prism 12, the objective lens 24 and the prisms 25 and 26. Then the telescope 7 is aimed at the second collimating point, the illuminator 10 is switched on again, thereby fixing in a similar way the second position assumed by the aperture 14 with respect to the code disk, the value of the horizontal angle to be measured between the first and second collimating points being determined as the difference between the results obtained when aiming at both of said collimating points.

When taking measurements of the vertical angles the telescope 7 is aimed at the first collimating point and the illuminator 15 together with the condenser lens 16, the prism 17, the diaphragm 18 with the slit aperture 19 and the objective lens 21 will turn through the angle being measured.

Figure 2:
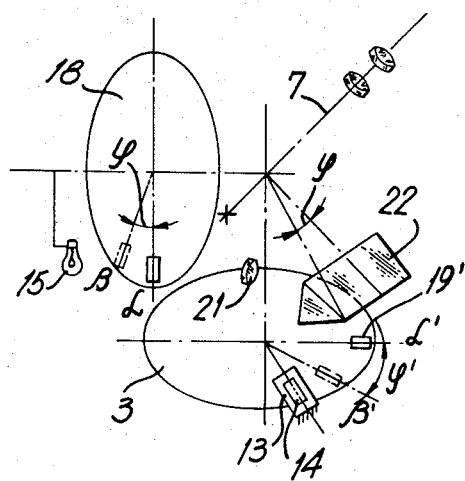
FIG. 2 is a simplified perspective view of a transducer capable of converting values of vertical angles into a digital code.

FIG. 2 represents a simplified diagram of the transducer 9 elucidating the measuring procedure of the vertical angle involved, the result of which measurement is read off the code disk which is simultaneously used as a code disk involved in taking measurements of the horizontal angle. With the telescope 7 assuming the initial position, the slit 19 occupy the position indicated at $\alpha$. Lit by the illuminator 15 the image of the slit 19 is projected onto the horizontal plate 3 as a light spot index 19' by means of the objective lens 21 and the prism 22 to assume the position indicated at $\alpha'$. When aiming the telescope 7 at the second collimating point, the slit 19 will turn through the angle $\varphi$ to occupy the position indicated at $\beta$ so that the slit 19 and the image thereof visible on the plate 3 as the light spot index 19'. will turn through the same angle to assume the position indicated at $\beta'$, i.e. to satisfy the following equality $$<\varphi = <\varphi'$$

The registration of the reading $\alpha$ is not essential in the theodolite. This value may be substituted by the reading $\rho$ registered through the aperture 14 of the diaphram 13 simultaneously with the reading $\beta'$ being taken.

The value of the vertical angle to be measured (angle of inclination) is derived from the equality below $$\varphi = (\beta' - \rho) + \theta$$

where:

$\beta'$ and $\rho$ indicate the readings taken concurrently from the code disk by the aperture 13 and the light spot index 19', respectively;

$\theta$ stands for the theodolite constant equal to $(\beta'-\rho)$ with the sight line of the telescope 7 strictly horizontal.

Thereupon the release knob of the photoregister 23 is pressed, said knob being mechanically associated with a synchrocontact of the illuminators 10 and 15, whereby said illuminators 10 and 15 light and the image of the portion of the code disk that is lit by the illuminator 10 through the condenser lens 11 and located opposite the aperture 14 of the diaphragm 13 is projected onto the photographic film 27 of the photoregister 23 through the prism 12 the objective lens 24 and the prisms 25 and 26. Concurrently, the image of the slit 19 of the diaphragm 18 lit by the illuminator 15 through the condenser lens 16 and the rectangular prism 17, is projected onto the surface of the horizontal plate 3 as the light spot index 19'. Concurrently with the results of measurement of the horizontal angle performed by means of the photoregister 23, the portion of the code disk illuminated through the slit 19 is projected onto the same frame of the photographic film 27 close to the previously projected image, whereby said frame of the photographic film 27 will carry the values of the horizontal and vertical angles being measured, represented as a digital code.

After accomplishing each consecutive measurement, the exposed frame of the photographic film 27 in the photoregister 23 is advanced to be replaced by the next unexposed frame.

Thereupon the entire procedure is repeated.

According to the second embodiment of the present invention, the theodolite operates in a similar manner to that described hereinbefore with reference to the first embodiment of the invention, the only difference residing the fact that the diaphragm 18 with the slits 28 made it possible to extend the measuring range of the vertical angles up to 360°.

The value of the vertical angle $\varphi$ being measured is derived from the formula below $$\varphi = (\beta - \alpha) - \theta + \frac{360° \ k}{n}$$

where:

$n$ is the number of the slit apertures 28 provided in the diaphragm 18;

$k$ stands for the ordinal number of the slit 28 determined by the code 29, the image of said slit 28 being projected onto the code disk at the very moment when the angle involved is being measured.

The employment of the same code disk for measuring both horizontal and vertical angles reduces the cost of the theodolite by about 20 percent as compared to the known theodolites of the same type.

Though this invention has been described herein with reference to preferable embodiments, it will be understood that minor changes in the details of construction may be made without departing from the spirit and scope of the invention, as will be readily understood by those skilled on the art.

All these alterations and changes will be considered to remain within the spirit and scope of the invention as defined by the claims that follow.

What is claimed is:

1. A coding theodolite having horizontal and vertical axes of rotation, said theodolite comprising a transparent circular plate having a concentric coding scale fixed on the vertical axis of the theodolite; a first diaphragm with an aperture arranged parallel to said plate in front of the coding scale; first illumination means on the other side of said plate in front of the aperture of the first diaphragm; a second diaphragm rigidly fixed on the horizontal axis of the theodolite and having at least one radial slit; second illumination means on one side of said second diaphragm for illuminating said slit of the second diaphragm; a first optical system for receiving a light beam passing through the slit of the second diaphragm and for projecting the image of said slit in the second diaphragm onto the coding scale of said plate such that angular movements of said slit of the second diaphragm in a vertical plane are equal to the angular movements of the image of said slit on the coding scale of said plate; a film photoregister and a second optical system facing the coding scale for projecting to said photoregister an image of a portion of the coding scale which is in front of the aperture of the first diaphragm and an image of the portion of the coding scale illuminated by the image of the slit of the second diaphragm.

2. A coding theodolite as claimed in claim 1, wherein said first optical system comprises an objective lens and a rectangular prism of right triangular shape with sides arranged respectively parallel to the planes of said second diaphragm and said plate, and a reflecting hypotenuse, said axes of rotation of said second diaphragm and said plate intersecting at a point through which passes a line drawn through said hypotenuse.

3. A coding theodolite as calimed in claim 1, wherein said diaphragm comprises a disc with a plurality of radial slits spaced at equal angular intervals, the ordinal number of each slit being present in the form of a digital code on said disk adjacent the respective slit.

References Cited

UNITED STATES PATENTS

| 2,111,516 | 3/1938 | Roux | 33—1(T) |
| 3,099,090 | 7/1963 | Frisch | 33—46 |
| 3,200,696 | 8/1965 | Lang et al. | 33—1(T) |
| 3,433,571 | 3/1969 | Brunson | 33—1 |

FOREIGN PATENTS

| 947,026 | 8/1956 | Germany | 33—69 |

HARRY N. HAROIAN, Primary Examiner

U.S. Cl. X.R.

33—1